United States Patent [19]
Monzini

[11] 3,830,272
[45] Aug. 20, 1974

[54] TIRE REINFORCING STRUCTURE
[76] Inventor: Renato Monzini, 16, Via Conte Verde, Milan, Italy
[22] Filed: Jan. 29, 1973
[21] Appl. No.: 327,461

[52] U.S. Cl. .............................................. 152;201
[51] Int. Cl. ............................................. B60c 9/16
[58] Field of Search ........... 152/211, 208, 198, 200, 152/201

[56] References Cited
UNITED STATES PATENTS

| | | | |
|---|---|---|---|
| 1,236,227 | 8/1917 | Stewart | 152/198 |
| 1,311,883 | 8/1919 | Eubank | 152/198 |
| 1,425,812 | 8/1922 | Turek | 152/201 |
| 2,565,619 | 8/1951 | Oest | 152/211 |

*Primary Examiner*—James B. Marbert
*Attorney, Agent, or Firm*—Wenderoth, Lind & Ponack

[57] ABSTRACT

A tire reinforcing structure in the form of a plurality of assemblies each formed by hinge or hook connected rigid elements at least partially embodied within the tire rubber.

8 Claims, 1 Drawing Figure

PATENTED AUG 20 1974 3,830,272
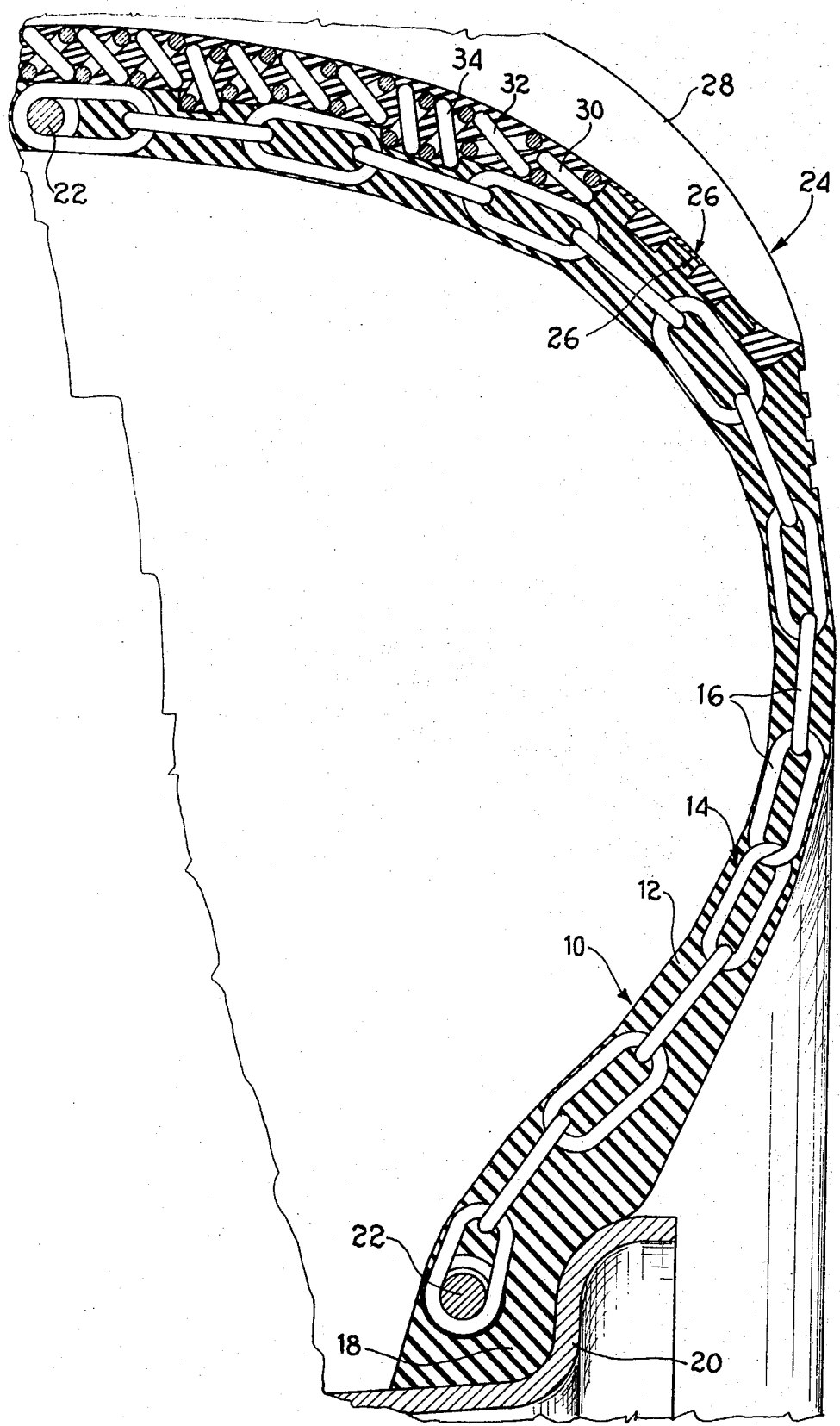

TIRE REINFORCING STRUCTURE

BACKGROUND OF THE INVENTION

This invention relates to a tire reinforcing structure as well as to a tire comprising such a reinforcing structure.

As is well known, in order to obtain good performance in a tire, the tire should have the characteristics of good adhesion to the road, wear resistance, shock absorption ability, deformability and ability to conform to any roadbed, such characteristics being obtained by a suitable selection of tire rubber physical properties and of air pressure within the tire tube.

It is also known that tires are generally reinforced with suitable means in order to prevent any elongation of the tire rubber which would otherwise occur under the stress of compressed air within the tire tube or tubeless tire. Such known reinforcing means are in the form of endless and flexible canvas linings or (even metallic) cords, embedded or positioned within the tire rubber.

A continuous deformation, due to the flattening of a tire tread portion, is suffered by a loaded tire when rolling on a roadbed. Such flattening is withstood by the tire stiffness and by the air pressure within the tire tube.

The structure of already known reinforcing materials causes an increase in the tire stiffness and thus a relatively high tire rolling resistance that counteracts the tire deformation stresses. This tire rolling resistance is also a function of tire rubber features and as it increase, the stronger is the hysteresis of the tire.

High rolling resistance values are due to the fact that commercially available reinforcing materials counteract any resilient tendency of the tire to return to its equilibrium configuration during the rotation thereof. Thus, e.g., in the tread-roadbed contact zone of a tire comprising conventional reinforcing materials -which zone is greater than that occurring when the tire is tangent to the roadbed - since a shortening of reinforcing material is impossible, a shifting of the whole tire body occurs to cause the tire body to be out-of-center with respect to the rotation axis of the tire, which results in an imbalance and greater rolling resistance to the rotating tire.

SUMMARY OF THE INVENTION

A reinforcing structure for motor-car tires according to this invention is characterized in that it comprises a plurality of assemblies of rigid elements that are suitably coupled and connected with one another and at least partly embedded or positioned within the tire rubber, in a manner to insure that the tire has the characteristics of both deformability and resistance. Each reinforcing assembly has the capability to shorten or contract itself and to conform to different tire rubber itself and to conform to different tire rubber stress conditions.

The rigid elements according to this invention are advantageously coupled and connected with one another by hinge or hook connections, and can be made of any suitable material, having suitable shapes and sizes.

The rigid element assemblies may be e.g. in the form of chains, wherein each rigid element is a chain link. As can be readily appreciated, such a chain can be easily shortened or contracted while an elongation thereof beyond the maximum extent of single chain link is positively avoided.

The number and arrangement of rigid element assemblies in the tire body can be selected at will. Thus, a plurality of rigid element assemblies, e.g. in the form of metal chains, may be located in different tire cross-sections, each chain extending from one tire bead to the other tire head.

A further plurality of rigid element assemblies may be circumferentially embedded or positioned within the tire tread rubber.

According to another feature of this invention, a tire comprising the above reinforcing structure may show at least a part of the rigid elements forming the reinforcing assemblies, that are lined by a tread rubber meeting suitable requirements of wheel grip and wear resistance, and then showing a high hysteresis, while a reduced hysteresis and thus a high resilience is shown by the remaining tire body rubber.

The tread rubber lining the rigid elements may have a suitable structure, e.g. in the form of suitably shaped single pieces, wherein suitable seats are formed to accommodate the rigid elements.

Another shape that may be taken by the reinforcing structure according to this invention is a net-like configuration formed by rigid elements and that can be shortened as a chain.

It has been surprisingly found that when a tire comprises a reinforcing structure formed by rigid element assemblies according to this invention, that are at least partly lined by hard rubber, whilst the tire body is made of a lower hysteresis rubber, then a lower rolling resistance, a higher carrying ability and a greater deformability are shown by such a tire.

As already stated, the rubber of a tire in use is continuously deformed and a part of such deformation work is not restored owing to the reinforcing structure. According to this invention, a reduced hysteresis is shown by the deformed rubber, while the tread rubber lining the rigid elements shows a minimum of deformation. Thus, the not restored portion of the deformation work as well as the tire rolling friction is smaller than that of conventional tires.

Owing to a lower rolling resistance shown by tires embodying this invention, less power is required to the driving wheels of a car and thus less heat is produced due to internal friction. This results in a longer tire life, as the tire rubber is not subjected to high temperatures.

Tires having reinforcing structures according to this invention can withstand higher air pressure, provided that the rigid elements of the different assemblies show sufficient strength values. Such higher air pressures mean higher tire carrying abilities, while the tire rolling resistance is not influenced by a greater or smaller section of the rigid reinforcing elements.

Tires embodying a reinforcing structure according to this invention can be utilized also as low-pressure tires in order to improve their ability to conform to any road bed type, as well as to absorb shocks.

Higher tire deformations will result in wider swivelling angles of the rigid reinforcement hinges, as well as in greater tire rubber deflections. However, the amount of produced friction heat is always smaller than that of conventional tires, under the same conditions of low-pressure application.

BRIEF DESCRIPTION OF THE DRAWING

The single FIGURE of the drawing shows a cross-sectional half view of a tire embodying this invention.

DETAILED DESCRIPTION OF PREFERRED EMBODIMENT

Referring to the drawing, a tire 10 comprises a tire body 12 made of rubber having a reduced hysteresis and a high resilience. Within tire body 12, a plurality of transversally arranged reinforcing assemblies are embedded or positioned at suitable intervals. One of these assemblies is shown in the drawing in the form of a metal chain 14 having a plurality of annular rigid elements 16 chain-linked with one another and extending from one tire bead 18 (that is shown in its operative position within a tire rim 20) to the other tire head.

Assemblies 14 are connected by means of a reduced number (f.i. three) of circumferentially arranged metallic cords 22. Further, tire 10 comprises a tread forming portion 24, suitably connected to tire body 12, e.g. by means of step-shaped zones 26 and having a suitable surface pattern forming a tire tread 28. Tread forming portion 24 is made of a rubber different from that of tire body 12 and has a high hysteresis, with suitable requirements of wheel grip and wear resistance.

Within tread forming portion 24, a further plurality of circumferentially arranged reinforcing assemblies are embedded or positioned. Again, the circumferentially arranged reinforcing assemblies may be in the form of metal chains 30, 32 ... having linked annularly-shaped rigid elements.

As shown, each chain is independently arranged with reference to adjacent chains, but suitable connecting elements may be also provided in order to hinge or hook connect the adjacent chains 30, 32, 34 . . . . .

I claim:

1. A vehicle tire comprising:
   a tire casing;
   a rubber tread portion attached to said tire casing circumferentially thereof about the outer periphery thereof; and
   a plurality of rigid reinforcing element assembly means, completely embedded within said rubber tread portion and extending circumferentially thereof, for preventing circumferential elongation of said tire beyond a predetermined dimension equal to the non-loaded circumferential dimension of said tire and for allowing localized contraction of said tire when loaded.

2. A tire as claimed in claim 1, wherein each of said assembly means comprises a plurality of rigid elements sequentially connected in such a manner that said assembly means will not elongate more than said predetermined dimension, but such that said assembly means will contract under compression.

3. A tire as claimed in claim 2, wherein each of said assembly means is a chain and each of said rigid elements is a chain link.

4. A tire as claimed in claim 3, wherein adjacent of said circumferentially extending chains are free from lateral connection therebetween, other than that provided by the rubber of said tread portion.

5. A tire as claimed in claim 3, further comprising connecting means for laterally interconnecting adjacent of said circumferentially extending chains.

6. A tire as claimed in claim 3, further comprising a plurality of rigid casing reinforcing assemblies embedded within said tire casing and extending laterally thereof between the beads thereof, each of said casing reinforcing assemblies comprising a plurality of rigid casing elements sequentially interconnected between said beads in such a manner that said casing reinforcing assembly will not elongate beyond the lateral cross-sectional dimension of said casing, but such that said assembly will contract under compression.

7. A tire as claimed in claim 6, wherein each of said casing reinforcing assemblies is a chain and each of said rigid casing elements is a chain link.

8. A tire as claimed in claim 3, wherein each of said chain links is formed of metal.

* * * * *